United States Patent

[11] 3,625,463

| [72] | Inventor | Julian W. Scholz<br>6001 S.E. Laurel St., Portland, Oreg. 97222 |
|---|---|---|
| [21] | Appl. No. | 12,636 |
| [22] | Filed | Feb. 19, 1970 |
| [45] | Patented | Dec. 7, 1971 |

[54] UTILITY BRACKET FOR POWER POLES AND THE LIKE
2 Claims, 5 Drawing Figs.

[52] U.S. Cl. .................................................. 248/221, 52/697, 174/158 R
[51] Int. Cl. ...................................................... H01b 17/16
[50] Field of Search .......................................... 248/221, 65, 230; 174/158 R, 43, 45, 163; 52/697; 287/189.36

[56] References Cited
UNITED STATES PATENTS
2,969,859  1/1961  Huggins .................... 287/189.36
3,272,463  9/1966  Greig ........................ 248/65
3,329,767  7/1967  Lindsey et al ............. 174/158

FOREIGN PATENTS
432,682  8/1926  Germany .................... 52/697

*Primary Examiner*—J. Franklin Foss
*Attorney*—Eugene M. Eckelman

ABSTRACT: A utility bracket has a laterally curved base portion for securement to a power pole or the like. This base portion has an integral baseplate offset forwardly therefrom by upper and lower arms and arranged to support power pole equipment. The upper and lower arms have inwardly curved side edges arranged to receive conduit extending up the pole. The bracket is attached to the pole by suitable bolt means extending through the baseplate or if desired through both the baseplate and the support face as well as through equipment supported thereon.

PATENTED DEC 7 1971
3,625,463
FIG. 1
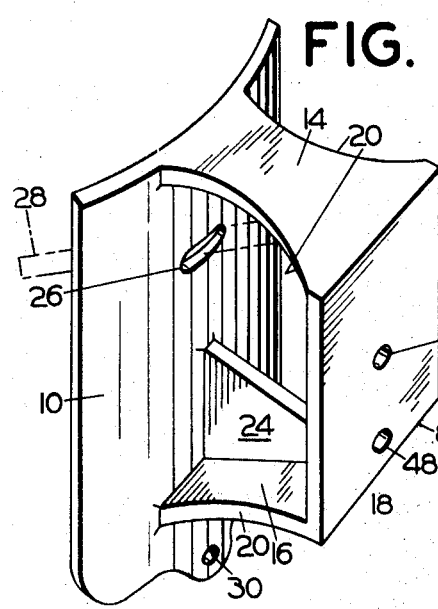
FIG. 2
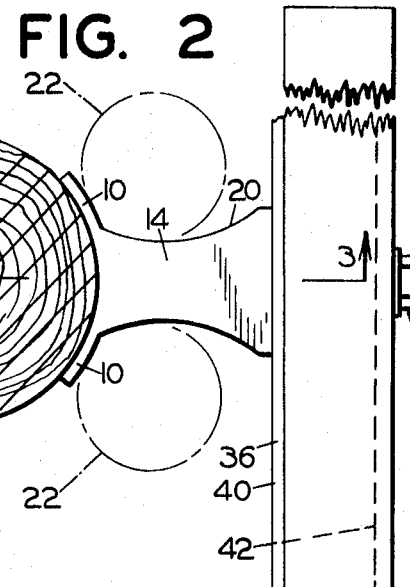
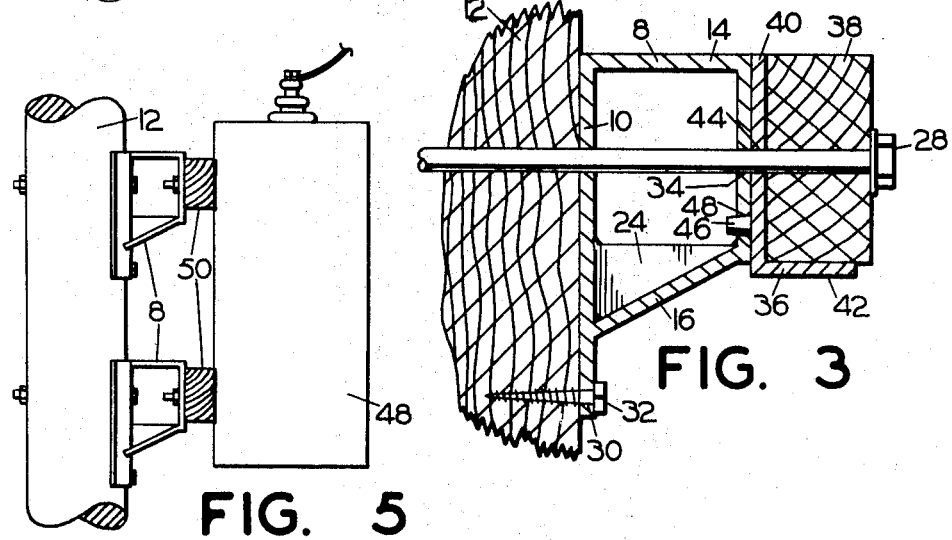
FIG. 3
FIG. 5
FIG. 4
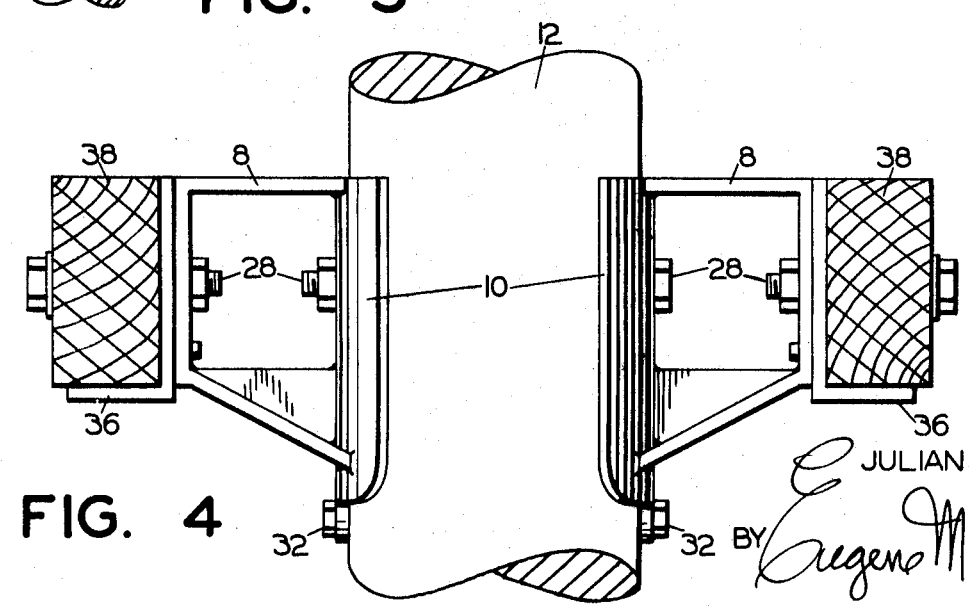
JULIAN W. SCHOLZ
INVENTOR.
BY Eugene M. Eckelman
ATTY.

UTILITY BRACKET FOR POWER POLES AND THE LIKE

BACKGROUND OF THE INVENTION

This invention relates to a new and novel bracket for holding equipment on power poles or the like.

Power poles for holding electric lines, telephone lines, transformers, or other equipment, most commonly use wooden crossarms for holding the wires. The crossarms are bolted to the poles, and conduit which extends up the poles must be located on surfaces around from the surfaces engaged by the crossarms. Thus, the arms and conduit, being spread out around the circumference of the pole interfere with climbers. In some instances, the conduits are mounted on brackets which hold the conduits away from the pole to clear the arms. This latter method of installation, however, locates the conduits out away from the pole which makes the arrangement unsightly and vulnerable to damage.

It is a feature of the present invention to provide a bracket for supporting equipment on power poles or the like having the novel feature that in addition to supporting the equipment on the pole it has means for holding upright conduit against the pole, thus providing a compact location of the conduit for making a better appearance as well as to leave a substantial area of the pole available for climbing.

More particular objects of the present invention are to provide a bracket of the type described having a support face offset outwardly from a base portion of the bracket whereby equipment supported by the bracket is offset from the pole, and also including concaved side edges in the bracket in which upright conduits or the like may be nested; to provide a bracket having means facilitating convenient attachment to a power pole; and to provide a bracket which is adapted for holding substantially all necessary types of equipment such as crossarms, transformers, and the like.

The invention will be better understood and additional objects and advantages will become apparent from the following description which illustrates a preferred form of the device.

BRIEF DESCRIPTION OF THE DRAWINGS

FIG. 1 is a perspective view of a bracket embodying features of the present invention;

FIG. 2 is a top plan view of the bracket attached to a power pole and having a crossarm mounted thereon;

FIG. 3 is a sectional view through the bracket taken on the line 3—3 of FIG. 2;

FIG. 4 is a fragmentary side elevational view of a power pole showing a pair of the present brackets secured thereto for supporting a pair of crossarms and;

FIG. 5 is a fragmentary elevational view of a power pole showing the present bracket employed in supporting a transformer.

DETAILED DESCRIPTION OF THE PREFERRED EMBODIMENT

With particular reference to the drawings and first to FIGS. 1, 2 and 3, the present bracket is designated by the numeral 8 and comprises a base plate or portion 10 having a lateral contour facilitating flush engagement with the contoured surface of a power pole 12. Extending forwardly from the convex or rear side of the plate 10 are integral upper and lower arms 14 and 16, respectively, which have integral connection with a front or face 18 comprising an equipment support plate. The plate 18 extends in a direction substantially parallel with the base plate 10, although it is to be understood that if necessary for certain equipment it may extend at any desired angle relative to said base plate.

Upper and lower arms 14 and 16, respectively, have concaved side edges 20 which as will be seen in greater detail hereafter form sockets for holding upright conduit 22, FIG. 2. In a preferred construction and as best seen in FIG. 3, the upper arm 14 extends substantially horizontally or at right angles from the base plate 10 and the lower arm 16 extends upwardly at an angle from the base plate, such structure providing a rigid support for the equipment mounting plate 18. Also, a reinforcing web 24 is provided between the lower arm 16 and the baseplate 10.

Base plate 10 has an aperture 26 at the upper portion thereof for receiving an attaching bolt 28. The aperture 26 is located above the vertical center or in other words toward the upper end of the base plate and is widened in an oval shape laterally of the base plate in order that a bolt can be inserted angularly from one side or the other of the bracket while clearing the face plate 18. A bolt 28, shown in phantom lines, is illustrated in partly installed position in FIG. 1. The base plate 10 extends downwardly beyond its connection with the lower arm 16 and such lower extension is provided with an opening 30 for receiving a lag screw 32 or other fastening means. Although a single bolt 28 by itself serves to firmly anchor the bracket on the pole, the lag screw 32 provides a more secure and nonrotative mounting attachment, particularly if the pole should shrink.

Face plate 18 has a bolt-receiving aperture 34 axially aligned with the aperture 26 in the base plate in order that a bolt 28 may extend through both the apertures 34 and 26 in attaching the bracket and equipment to the pole, as will hereinafter be described.

For the purpose of mounting crossarms on a pole, it is preferred that a cradle arm 36 be utilized which as best seen in FIG. 3 is used for supporting a crossarm 38. Cradle 36 has a right angular configuration with an upright wall 40 and a bottom wall 42. The upright wall 40 has an aperture 44 for receiving the mounting bolt. In an installed position of the cradle 36, the upright wall 40 lies against the face plate 18 and the crossarm 38 seats on the bottom wall 42 and is bolted securely against the wall 40. Cradle 36 has a substantial length for supporting the crossarm 38, as seen in FIG. 2, and for maintaining the cradle and crossarm in a nonrotative engagement on the bracket, the wall 40 has a rearwardly extending tapered projection 46 below the mounting bolt 28 adapted for engagement with an aperture 48 in the face plate 18 of the bracket.

Various combinations of bracket mounting and equipment holding functions are available with the present bracket construction. For example, a single crossarm can be mounted on the pole with a single mounting bolt 28 wherein the bolt extends all the way through the pole, the bracket and the crossarm, as shown in FIG. 3. Although not shown herein, it is to be understood that another crossarm may be mounted on the opposite side of the pole and bolt 28 capable of extending completely through both mounting structures and the crossarms so that a double crossarm can be provided with a single mounting bolt 28. Also, it is to be understood that two mounting bolts may be provided for each bracket, one to hold the bracket on the pole and the other to hold the crossarm on the face plate 18. Or, as shown in FIG. 4, where crossarms are located on opposite sides of the pole a mounting bolt 28 may be used to secure the brackets to the pole and additional bolts 28 may be used for attaching the crossarms to their respective face plates 18. Furthermore, the brackets 8 may be employed for mounting other types of equipment on a pole, such as a transformer 48, FIG. 5. For this purpose, the transformer has brackets 50 of suitable construction for bolting to the face of brackets 8.

In all cases, any conduit which must extend up the pole is placed in the curved portions 20 of the bracket arms 14 and 16. Such conduit in this arrangement is maintained close to the pole for securement thereto and does not take up extra space around the pole to clutter the climbing area. In other words, the conduit and mounting means for the equipment are disposed on the same side of the pole and the remaining areas of the pole are free for climbing. In addition to facilitating the attachment of equipment to the power pole, the present bracket makes for a compact arrangement of such equipment and conduit, thus making a neater appearance than present day methods. The open sides of the bracket allow use of wrenches including crescent-type adjustable wrenches when necessary.

It is to be understood that the form of any my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A utility bracket for power poles and the like comprising
   a. a base portion adapted to seat against the surface of a pole,
   b. arm means having inner and outer ends,
   c. the said arm means projecting outwardly from said base portion with the inner end thereof being integrated with said base portion,
   d. support means on the outer ends of said arm means arranged to support equipment,
   e. and securing means arranged to secure said bracket to a power pole,
   f. said arm means having opposite vertical side surfaces,
   g. at least one of said side surfaces having a concaved portion between the inner and outer ends of said arm means forming a socket arranged to receive conduit extending up the pole.

2. The utility bracket of claim 1 wherein
   a. said securing means comprises a bolt,
   b. means defining an aperture in said base portion,
   c. said aperture being laterally elongated to permit angled insertion of the bolt therein,
   d. said support means comprising a face plate,
   e. means defining an aperture in said face plate for receiving an attaching bolt,
   f. a cradle arranged to support power equipment and also arranged to be secured to said face plate by an attaching bolt extending through said aperture in the face plate,
   g. said arm means comprising upper and lower arms with the lower arm being angled downwardly from said support means to said base portion,
   h. means defining an aperture adjacent the lower end of said base portion for receiving additional attachment means,
   i. means defining an opening in one of said face plate and cradle vertically spaced from said aperture therein,
   j. and a projection on the other of said face plate and cradle arranged to be received in said opening to anchor said cradle on said face plate against rotation.

* * * * *